Nov. 19, 1968 C. J. HILL 3,411,828
FEED APPARATUS FOR A POULTRY GIZZARD PROCESSING MACHINE
Filed Oct. 20, 1966 2 Sheets-Sheet 1

Inventor:
Carl J. Hill
By Darbo, Robertson & Vandenburgh
Attys.

Nov. 19, 1968  C. J. HILL  3,411,828
FEED APPARATUS FOR A POULTRY GIZZARD PROCESSING MACHINE
Filed Oct. 20, 1966  2 Sheets-Sheet 2
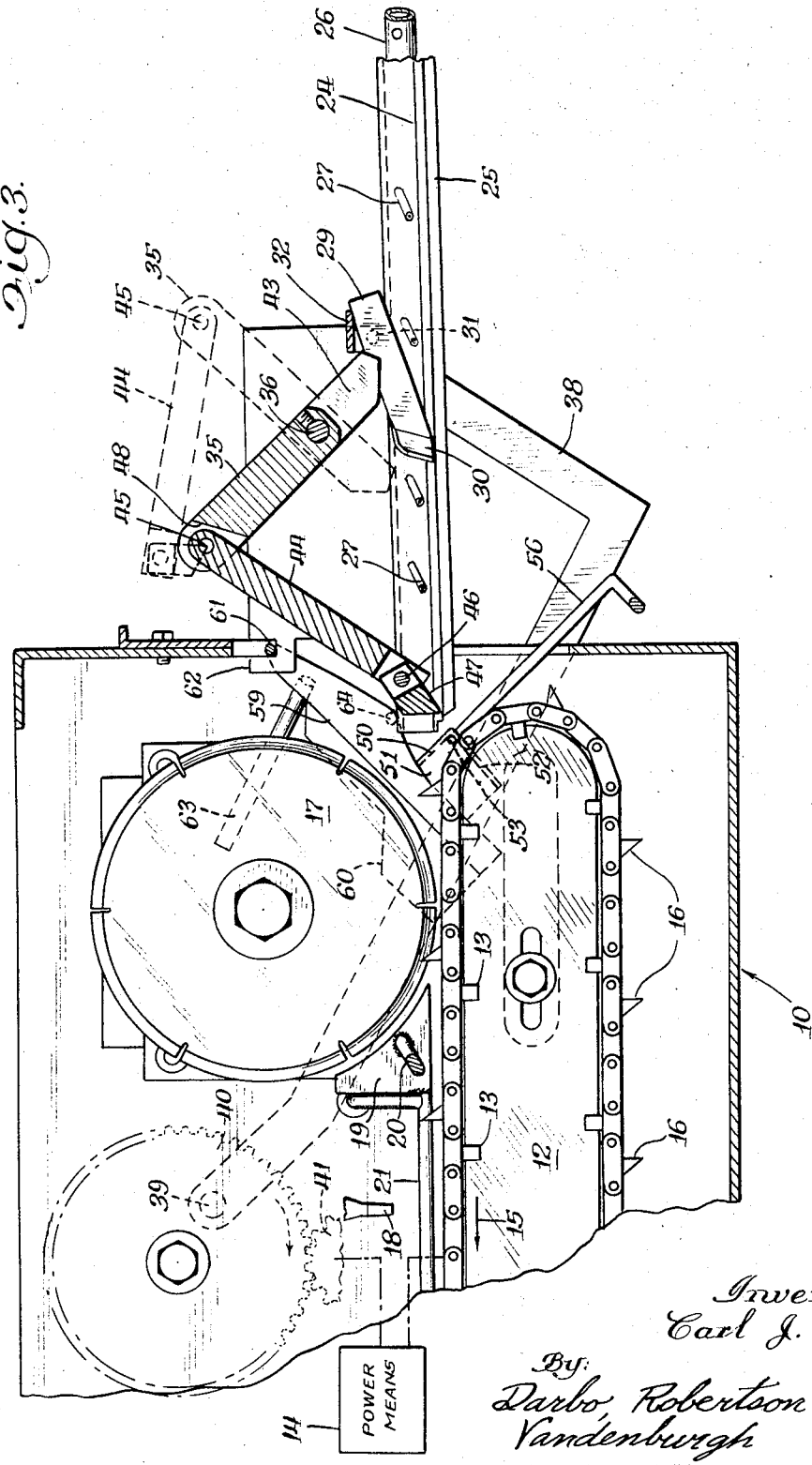

United States Patent Office 3,411,828
Patented Nov. 19, 1968

3,411,828
FEED APPARATUS FOR A POULTRY GIZZARD PROCESSING MACHINE
Carl J. Hill, Box 409, Canton, Ga. 30114
Filed Oct. 20, 1966, Ser. No. 588,176
18 Claims. (Cl. 302—14)

The present invention relates to improvements in a feed apparatus for a poultry gizzard processing machine, and the following disclosure thereof is offered for public dissemination upon the grant of a patent therefor.

The poultry gizzard processing machine of the general type to which the present improvements relate is shown in FIGURES 11–15 of my prior Patents 3,159,872 and 3,172,148. Such processing machines employ the stomach, connected to the gizzard, to orient the gizzard in the machine for most effective processing. The gizzard is loaded onto an endless chain having projecting spikes which engage the gizzard. The chain then moves the gizzard past a cutting knife where it is slit open, through a washing station at which the interior of the gizzard is flushed, and hence to a lining removal station at which the lining of the gizzard is extracted. The improvements of the present invention ensure that the stomach is centered on the chain and securely engaged by the spikes. The movement of the stomach with the chain then draws the gizzard onto the chain and the gizzard is properly oriented for most effective processing.

Another feature of the present invention is that the gizzards are loaded onto the chain in timed relationship to the movement of the chain. This is important from the standpoint of making sure that each gizzard is properly and effectively processed. Furthermore, with some such machines it is important in other parts of the machine that the gizzard be positioned on the chain in timed relationship to the movement of the chain. An example of such will be found in my patent application entitled "Improvements In Poultry Gizzard Processing Machine" filed concurrently herewith, the disclosure of which is incorporated herein by reference. To this end, I have provided a simple feeding mechanism which will deliver the gizzards one at a time to the chain in timed relationship to the movement thereof.

Further objects and advantages will become apparent from the following description taken in conjunction with the drawings in which:

FIGURE 3 is a section through the illustrated embodiment parallel to and along the front side of the chain.

Figure 1:
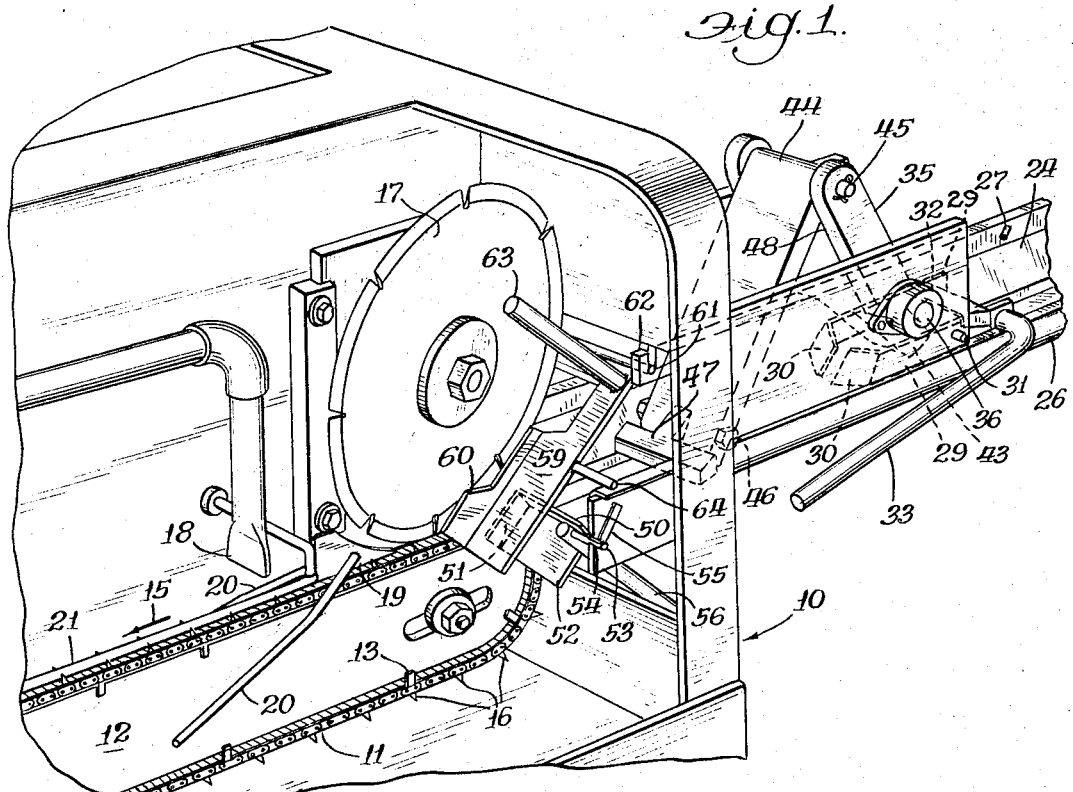
FIGURE 1 is a perspective view of the loading station as seen approximately from the side thereof.
Figure 2:
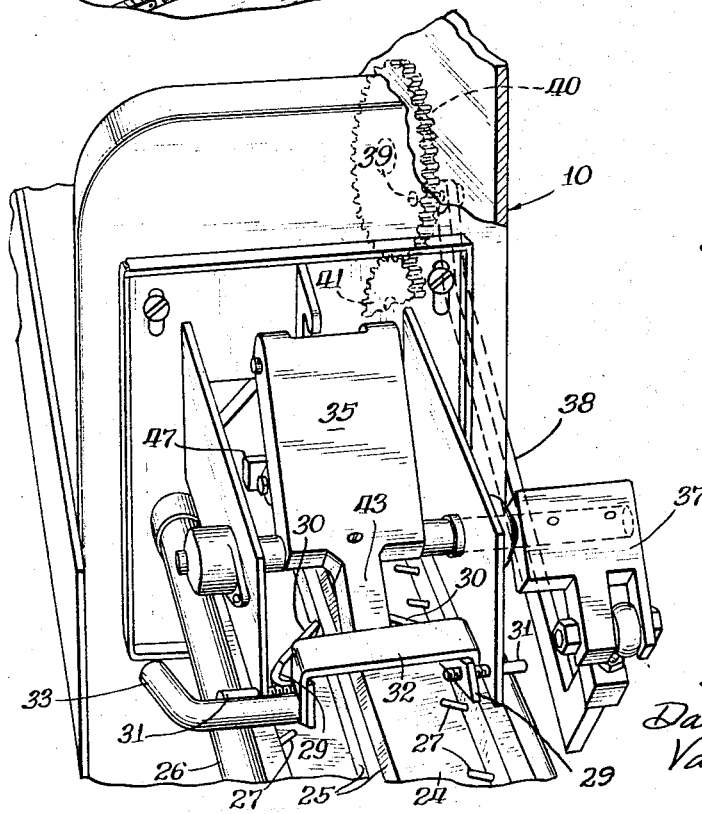
FIGURE 2 is a perspective view of the loading station as seen from the end.

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose; as it is these that meet the requirement of pointing out the parts, improvements, or combinations in which the inventive concepts are found.

The apparatus of the illustrated embodiment comprises a frame, generally 10, on which is mounted a gizzard transporting means in the form of an endless chain conveyor 11. Conveyor chain 11 moves about a guide 12 secured to the frame. Fingers 13 overlap opposite sides of the guide 12 to keep the chain centered thereon. The chain 11 moves about a sprocket, not shown, which is driven by power means 14 to move the chain in the direction indicated by arrow 15. Chain 11 has a plurality of outwardly projecting spikes 16 to engage the gizzards and stomachs and move them past a power driven rotary cutting knife 17, through a washing section and hence to a gizzard lining removal section. Part of the washing section is shown in the form of nozzle 18 connected to a suitable source of water supply. Immediately after passing knife 17 the gizzards are separated by a divider 19 having wings 20 which fold open the gizzard so that the interior thereof is exposed for washing. The gizzard is thus draped over the top run of chain 11. A guide rod 21 extends between the spaced pairs of projections 16 and the opened gizzard is held by spikes 16 and guide rod 21.

Where the chain 11 moves about the end of guide 12 (at the right in FIGURES 1 and 3) the transporting means defines a pickup point for the stomachs and gizzards. These are fed to the pickup point along a conveyor in the form of a chute or trough 24. This chute is in two parallel longitudinal sections. The adjacent sides 25 of the sections are turned down to form a groove having an open bottom. This groove has a width of a size to receive a side of a stomach and to align the stomach in the groove. The open bottom or slot between the sides 25 is sufficiently narrow to prevent a stomach from passing therebetween. Chute 24 is inclined downwardly toward the pickup point.

Along each side of the chute are water pipes 26. Nozzles 27 extend inwardly from water pipes 26 and are positioned so as to project streams of water over the surface of the chute in the general direction of the pickup point. Absent other factors, these jets of water cause the stomachs and gizzards to glide along the chute in the direction of the pickup point. The plurality of jets ensure a smooth, even movement of the stomachs and gizzards along the trough, to an extent that is not achieved by single jets on opposite sides of the trough. The continuous slot along the bottom of the chute prevents any (even transient) damming of the water in the trough.

In moving toward the pickup point the stomachs and gizzards encounter a first gate defined by a pair of arms 29 having closures 30 extending inwardly toward each other. The upstream faces of closures 30 are inclined downwardly, as well as towards each other, thus forming cam faces to facilitate opening the first gate when required for the passage of a gizzard. The spacing of the adjacent ends of closures 30 is such that, in connection with the groove 25, the stomachs, which are preceding the gizzards will pass through the gate, but the gizzard, attached to the stomach which has passed through, will be held up by the gate. Arms 29 are pivoted on pins 31 and connected by bracket 32 so that they move in unison. A counterweight 33, in conjunction with the positioning of arms 29 on pins 31, urges the arms to the gate closed position illustrated in the drawings.

A gizzard feeding apparatus is defined by a rocker 35 secured to shaft 36. Shaft 36 is suitably journaled in bearings mounted on frame 10 and has a crank 37 secured to the end thereof. A connecting rod 38 is pivotally attached to crank 37 and is journaled on an eccentrically positioned pin 39 secured to gear 40. Gear 40 is driven by power means 14 through a driving gear 41. As gear 40 turns through a revolution, rocker 35 is moved between the full line position (FIGURE 3) and the dotted line position. The bottom end of rocker 35 defines a projecting finger 43 having a width slightly narrower than, and aligned with, the space between the adjacent ends of closures 30. A link 44 is pivotally attached to the upper end of rocker 35 by pin 45. Similarly, a pin 46 attaches a pusher 47 to the lower end of link 44. Between the bifurcated upper ends of rocker 35 is an abutment 48 which supports link 44 when rocker 35 is moved toward the dotted line position, illustrated in FIGURE 3.

At the pickup point is a lower gate which consists of two portions, each being at an opposite side of conveyor chain 11. Each portion includes an upper plate 50, an approximately vertical inner plate 51, and a rearward plate 52. Each portion also has an outwardly extending pivot pin 53 received in a slot 54 in frame 10. A clip 55 releasably holds pin 53 in slot 54. The only connection between the two portions is formed by a generally U-shaped bracket 56. Bracket 56 also serves as a counterweight to normally hold the lower gate in the position illustrated in FIGURES 1 and 3.

Above the lower gate is an upper gate formed by two side plates 59 having upwardly projecting flanges 60 immediately adjacent each side of chain 11. Plates 59 are secured to a pivot rod 61 journaled in holders 62 of frame 10. Outwardly extending arm 63 serves as a counterweight. Projecting pin 64 contacts the top of a portion of frame 10 to limit the downward pivotal movement of the upper gate.

Gizzards with the stomachs attached are deposited in chute 24 with the stomach preceding the gizzard down the chute. This may be done either manually or by machine. By the action of the water from nozzles 27, they are moved down the chute in the direction of the pickup point until the gizzard is arrested by closures 30 of the first gate. Subsequently, rocker 35 moves from the full line position of FIGURE 3 to the dotted line position. In doing so finger 43 thereof engages the gizzard being held by the gate and pushes the gizzard forwardly against the inner faces of closures 30. Due to the positioning of these faces the pressure of the gizzard thereagainst cams the closures upwardly with the gate pivoting about pins 31. This permits the gizzard to continue to move forward until being released prior to finger 43 reaching the dotted line position of FIGURE 3.

The water flow from jets 27 cause the gizzard to move on down trough 24 until being arrested at the pickup point by contact with the upwardly disposed plates 50 of the lower gate. The stomach will have passed between inner plates 51 of the lower gate and onto chain 11 to be engaged by a pair of spikes 16. As the stomach is drawn in the direction indicated by arrow 15, it pulls on the gizzard. The pressure of the gizzard on upper plates 50 of the lower gate cause the lower gate to pivot about pins 53 and permit the gizzard to move across the upper plates 50, which serve as supporting surfaces, and onto the chain. The inner faces or flanges 60 of the upper gate ensure that the stomach is centered on the chain as it is cut by knife 17. The movement of the gizzard along chain 11, away from the pickup point, cams the upper gate upwardly by pressure against side plates 59. As the gizzard is cut by knife 17 the side plates 59 tend to start spreading it open. Continued opening of the gizzard after cutting is produced by divider 19 and its wings 20. The gizzard is then laid out on the top run of chain 11 for washing.

While it is preferred that the gizzards introduced into the machine have the stomachs attached, there will be instances where, for one reason or another, the stomach has become previously detached from the gizzard. In such instances the gizzard, after passing the first gate, will come to rest against upper plates 50 of the lower gate. Since these gizzards do not have the stomachs attached to drag the gizzards onto the conveyor, the gizzards remain against plates 50. Rocker 35 continues its movement, traveling from the dotted line position of FIGURE 3 toward the full line position. In doing so link 44 swings down so that pusher 47 is deposited behind the gizzard. Further movement of rocker 35 forces the pusher 47 against the gizzard so that the gizzard pushes against plates 50 to pivot the lower gate and allow the gizzard to move onto chain 11 to be engaged by spikes 16.

I claim:

1. In a gizzard processing machine of the type having a transporting means driven by power means and including a vertical cutting means for splitting the gizzards loaded onto the transporting means at a pickup point and including a trough along which the gizzards are moved to the pickup point, the improvement comprising: a gate in said trough upstream of said pickup point to stop the gizzards moving along said trough; and feeding means associated with said gate to engage the forwardmost gizzard stopped by said gate, to open said gate and to feed said forwardmost gizzard to said pickup point; said gate closing after said forwardmost gizzard has passed to stop the remaining gizzards in said trough.

2. In a gizzard processing machine as set forth in claim 1, wherein said gate includes two pivotally mounted arms extending downstream from a pivotal axis therefor, said arms having closure portions downstream from said pivotal axis, said arms being urged to the gate closed position.

3. In a gizzard processing machine as set forth in claim 2, wherein said closure portions slant downstream forming upstream cam faces to force the portions to the gate open position as a gizzard is pushed against said faces, said feeding means forcing said forwardmost gizzard against said faces to open the gate.

4. In a gizzard processing machine as set forth in claim 3, wherein said portions having ends spaced from each other to define an opening therebetween, said feeding means having a finger movable through said opening.

5. In a gizzard processing machine as set forth in claim 4, wherein said feeding means is connected to said power means to move in timed relationship to the movement of said transporting means, and wherein said feeding means includes a pusher movable toward said pickup station from a position along said trough downstream of said gate and thereafter raises and retracts to said position to arrive at the rear of a sequential gizzard which has passed said gate.

6. In a processing machine for gizzards having the stomachs attached, said trough having means to align the stomachs with the transporting means and including a bifurcated upper gate pivoted about an axis above the path of movement of the gizzards and stomachs with the two sides of the gate at the distal end thereof being positioned at opposite sides of said cutting means, and as set forth in claim 5, the improvement comprising: a flange on each of said sides and extending upwardly therefrom, said flanges being adjacent and spaced from the sides of said cutting means and said transporting means.

7. In a processing machine as set forth in claim 6, including a lower gate mounted for pivotal movement about a line below the upper surface of said trough, said lower gate having a supporting surface which when said lower gate is in a first position is upwardly inclined at the downstream end of said trough and when said lower gate is in a second position forms an extension of part of said trough at the downstream end thereof, said lower gate comprising two parts positioned on opposite sides of said transporting means; and means connected to said lower gate to urge said gate to said first position with the lower gate being pivoted to the second position against said urging as a gizzard moves against and across it.

8. In a processing machine for gizzards having the stomachs attached, said trough having means to align the stomachs with the transporting means and including a bifurcated upper gate pivoted about an axis above the path of movement of the gizzards and stomachs with the two sides of the gate at the distal end thereof being positioned at opposite sides of said cutting means, and as set forth in claim 1, the improvement comprising: a flange on each of said sides and extending upwardly therefrom, said flanges being adjacent and spaced from the sides of said cutting means and said transporting means.

9. In a processing machine as set forth in claim 8, including a lower gate mounted for pivotal movement about a line below the upper surface of said trough, said lower gate having a supporting surface which when said lower gate is in a first position is upwardly inclined at the downstream end of said trough and when said lower gate is in a second position forms an extension of part of said trough at the downstream end thereof, said lower gate comprising two parts positioned on opposite sides of said transporting means; and means connected to said lower gate to urge said gate to said first position with the lower gate being pivoted to the second position against said urging as a gizzard moves against and across it.

10. In a gizzard processing machine as set forth in claim 1, wherein said feeding means is connected to said power means to move in timed relationship to the movement of said transporting means.

11. In a processing machine as set forth in claim 10, including a lower gate mounted for pivotal movement about a line below the upper surface of said trough, said lower gate having a supporting surface which when said lower gate is in a first position is upwardly inclined at the downstream end of said trough and when said lower gate is in a second position forms an extension of part of said trough at the downstream end thereof, said lower gate comprising two parts positioned on opposite sides of said transporting means; and means connected to said lower gate to urge said gate to said first position with the lower gate being pivoted to the second position against said urging as a gizzard moves against and across it.

12. In a processing machine as set forth in claim 11, wherein said feeding means includes a pusher movable toward said pickup station from a position along said trough upstream of said gate and thereafter raises and retracts to said position to arrive at the rear of a sequential gizzard which has stopped against said gate.

13. In a gizzard processing machine as set forth in claim 1, wherein said trough is inclined downwardly toward said pickup point and has a central longitudinal slot therein, and including a plurality of water discharge nozzles at intervals along opposite sides of said trough, said nozzles being positioned to direct streams of water inwardly of said trough in the general direction of said pickup point.

14. In a machine for processing gizzards with the stomachs attached, said machine being of the type having a narrow transporting means, with projecting spikes, driven by power means and extending from a pickup point past a vertical cutting means for splitting the stomachs and the gizzards loaded onto the transporting means at the pickup point and having a conveyor along which the stomachs and gizzards are moved to the pickup point with the stomachs preceding the attached gizzards, the improvement comprising: a lower gate mounted for pivotal movement about a line below the upper surface of said conveyor, said lower gate having a supporting surface which when said lower gate is in a first position is upwardly inclined at the downstream end of said conveyor and when said lower gate is in a second position forms an extension of part of the conveyor at the downstream end thereof, said lower gate comprising two parts positioned on opposite sides of said transporting means; and means connected to said lower gate to urge said gate to said first position with the lower gate being pivoted to the second position against said urging as a gizzard moves against and across it.

15. In a processing machine for gizzards having the stomachs attached, said trough having means to align the stomachs with the transporting means and including a bifurcated upper gate pivoted about an axis above the path of movement of the gizzards and stomachs with the two sides of the gate at the distal end thereof being positioned at opposite sides of said cutting means, and as set forth in claim 13, the improvement comprising: a flange on each of said sides and extending upwardly therefrom, said flanges being adjacent and spaced from the sides of said cutting means and said transporting means.

16. In a machine as set forth in claim 15, including feeding means associated with said conveyor to move a stomach having a gizzard attached thereto, or a gizzard without a connected stomach, to said pickup point in timed relationship to the movement of said transporting means.

17. In a gizzard processing machine of the type having a transporting means driven by power means and including a vertical cutting means for splitting the gizzards loaded onto the transporting means at a pickup point and including a trough along which the gizzards are moved to the pickup point, the improvement comprising: said trough being inclined downwardly toward said pickup point and having a central longitudinal slot therein, and including a plurality of water discharge nozzles at intervals along opposite sides of said trough, said nozzles being positioned to direct streams of water inwardly of said trough in the general direction of said pickup point.

18. In a machine as set forth in claim 17, wherein the portions of said trough defining said slot extend downwardly forming a groove with the slot being in the bottom of the groove, said groove being of a size to receive a stomach, said slot being narrower than said stomach.

References Cited

UNITED STATES PATENTS

| | | | |
|---|---|---|---|
| 2,787,362 | 4/1957 | Hill | 17—11 |
| 3,159,872 | 12/1964 | Hill | 17—11 |
| 3,160,443 | 12/1964 | Harris et al. | 302—2 |
| 3,172,148 | 3/1965 | Hill | 17—11 |

ANDRES H. NIELSEN, *Primary Examiner.*